(12) United States Patent
Yun et al.

(10) Patent No.: US 9,697,225 B2
(45) Date of Patent: Jul. 4, 2017

(54) METHOD FOR SYNCHRONIZING FILE

(71) Applicant: SAMSUNG SDS CO., LTD., Seoul (KR)

(72) Inventors: Ju Seok Yun, Seoul (KR); Yong Tae Kim, Seoul (KR); Hyeong Goo Kim, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 79 days.

(21) Appl. No.: 14/588,119

(22) Filed: Dec. 31, 2014

(65) Prior Publication Data

US 2016/0110377 A1 Apr. 21, 2016

(30) Foreign Application Priority Data

Oct. 21, 2014 (KR) ........................ 10-2014-0142850

(51) Int. Cl.
*H04L 29/06* (2006.01)
*G06F 17/30* (2006.01)
*G06F 21/62* (2013.01)

(52) U.S. Cl.
CPC .... *G06F 17/30174* (2013.01); *G06F 21/6218* (2013.01); *H04L 63/0428* (2013.01); *H04L 63/08* (2013.01)

(58) Field of Classification Search
None
See application file for complete search history.

(56) References Cited

U.S. PATENT DOCUMENTS

| | | | | |
|---|---|---|---|---|
| 7,788,225 B2 * | 8/2010 | Fish | ................... | G06F 11/1662 707/624 |
| 7,882,084 B1 * | 2/2011 | Amdahl | ............ | G06F 17/30522 707/693 |
| 8,306,948 B2 | 11/2012 | Chou et al. | | |
| 8,543,539 B2 * | 9/2013 | Ahluwalia | ........ | G06F 17/30312 707/613 |
| 8,782,441 B1 * | 7/2014 | Osterwalder | ......... | G06F 21/602 713/193 |
| 9,235,593 B2 * | 1/2016 | Huang | .............. | G06F 17/30174 |
| 2012/0191675 A1 * | 7/2012 | Kim | .................. | G06F 17/30156 707/692 |
| 2013/0138607 A1 * | 5/2013 | Bashyam | .......... | G06F 17/30174 707/610 |
| 2014/0198801 A1 * | 7/2014 | Venkatesh | ............... | H04L 49/10 370/401 |
| 2014/0222770 A1 * | 8/2014 | Lad | ......................... | E21D 20/02 707/692 |

(Continued)

FOREIGN PATENT DOCUMENTS

WO 2010114856 A1 10/2010

*Primary Examiner* — Christopher Revak
(74) *Attorney, Agent, or Firm* — Sughrue Mion, PLLC

(57) ABSTRACT

Provided is a method of file synchronizing. The method includes: determining whether there is a changed matter in a file which is divided into a plurality of chunk files; calculating a hash value for each of plurality of divided chunk files when it is determined that there is a changed matter in file; transmitting a hash value list configured by calculated hash values to a server; receiving a transmission request for a chunk file corresponding to a hash value which is not stored in server, among hash values included in hash value list; and transmitting chunk file to the server in response to the transmission request.

17 Claims, 6 Drawing Sheets

(56) References Cited

U.S. PATENT DOCUMENTS

| | | | |
|---|---|---|---|
| 2015/0006475 A1* | 1/2015 | Guo | G06F 17/30159 |
| | | | 707/609 |
| 2015/0199243 A1* | 7/2015 | Wu | G06F 11/1458 |
| | | | 707/626 |
| 2015/0234710 A1* | 8/2015 | Berrington | G06F 11/1407 |
| | | | 707/664 |
| 2016/0381023 A1* | 12/2016 | Dulce | H04L 63/10 |
| | | | 726/9 |

\* cited by examiner

METHOD FOR SYNCHRONIZING FILE

CROSS-REFERENCE TO RELATED APPLICATION

This application claims priority from Korean Patent Application No. 10-2014-0142850 filed on Oct. 21, 2014, in the Korean Intellectual Property Office, and all the benefits accruing therefrom under 35 U.S.C. 119, the contents of which in its entirety are herein incorporated by reference.

TECHNICAL FIELD

The present invention relates to a file synchronizing method, and more particularly, to a file synchronizing method which stores data by dividing the data in the form of a plurality of chunk files and prevents the same chunk file from being redundantly stored to efficiently use a storage space and synchronize the file at a rapid speed.

BACKGROUND ART

Various methods which store large quantity of data in various storage environments such as a cloud, and a server device and synchronize the data with a personal terminal device are widely used. For example, in the case of a delta synchronization (delta sync) method, when changed contents of a file which has been stored in a terminal device is synchronized with the server, only changed blocks of the file, instead of the entire file, are transmitted, thereby minimizing a time for synchronization.

Technologies such as metadata synchronization meta sync) or deduplication synchronization (deduplication sync) are widely utilized.

However, various synchronizing methods of the related art independently exist for every function, but there is no combined synchronizing method, so that all of the advantages of individual synchronizing methods may not be fully utilized.

SUMMARY

The present invention has been made in an effort to provide a file synchronizing method which combines various synchronizing methods as one to maximize transmission efficiency and minimize data to be transmitted for synchronization.

The present invention has also been made in an effort to provide a file synchronizing method which stores a file in the form of an encrypted chunk file to increase security.

The present invention has also been made in an effort to provide a file synchronizing method which distributes data processing by dividing a hash table of a chuck file for synchronization and a server in which the chunk file is actually stored to minimize a time to perform synchronization between a server device and a user terminal device.

Technical objects of the present invention are not limited to the aforementioned technical objects and other technical objects which are not mentioned will be apparently appreciated by those skilled in the art from the following description.

As described above, in order to synchronize two devices, the entire file is not transmitted, but the file is divided into a plurality of chunk files and then hash values for the chunk files are transmitted to perform a synchronizing process, thereby minimizing a transmission amount required for synchronization and minimizing a time to perform synchronization.

BRIEF DESCRIPTION OF THE DRAWINGS

The above and other features and advantages of the present invention will become more apparent by describing in detail embodiments thereof with reference to the attached drawings in which.

DETAILED DESCRIPTION OF THE INVENTION

Figure 1:
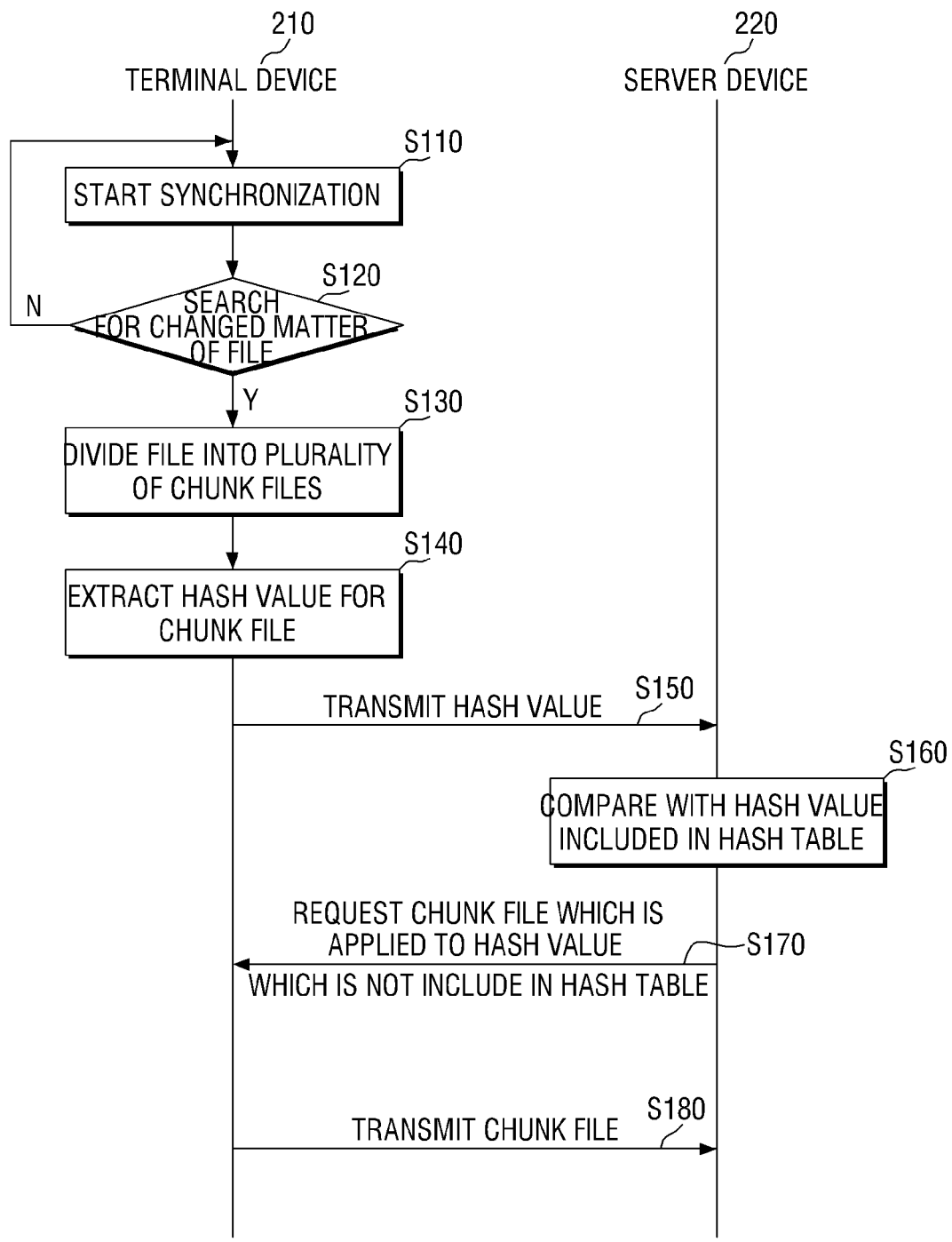
FIG. 1 is a flowchart for explaining a file synchronizing method according to an embodiment of the present invention.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Hereinafter, a file synchronizing method according to an embodiment of the present invention will be described with reference to FIG. 1. The embodiment may be carried out by a computing device including an operating unit. The computing device may be, for example, a file synchronizing device according to another embodiment of the present invention. A configuration and an operation of the file synchronizing device will be described in detail below. Hereinafter, for the convenience of description, a subject which performs each operation of the file synchronizing method according to the embodiment will be omitted.

A user may synchronize data stored in a terminal device with another terminal device at every desired time or at a predetermined interval of time in step S110. Here, the terminal device may be provided as one of various components of an electronic device such as a desktop computer, a workstation, a personal digital assistant (PDA), a portable computer, a wireless phone, a mobile phone, a smart phone, an e-book, a portable multimedia player, a portable game player, a navigation device, a black box, a digital camera, a television, a device which transmits and receives information in a wireless environment, one of various electronic devices which configure a home network, one of various electronic devices which configure a computer network, one of various electronic devices which configure a telematics network, a smart card, or one of various components which configure a computing system.

Alternatively, after storing data in a server device having a large quantity of storage space as a backup, the data is periodically synchronized, so that the data which is stored in a user terminal device may also be stored in the server device.

When synchronization starts, it is determined whether there is a file which has a changed matter, among a plurality of file data which has been stored in the user terminal device in step S120. Specifically, it is determined whether there is a changed matter by checking metadata of the file. Since the metadata includes information on a history of the file such as a latest update time, it is checked whether there is a file which has a changed matter by checking the metadata. In the meantime, the changed matter which occurs in the file data may be one of addition of new data, deletion of data, or partial modification of existing data.

When it is determined that there is a file having a changed matter, among the files which have been stored in the terminal device, the file having a changed matter is divided into a plurality of chunk files in step S130. The chunk file refers to a file obtained by dividing a large quantity file so as to have a predetermined size. File data which is divided into the plurality of chunk files may be reassembled as one file later, through a file table.

When the file having a changed matter is divided into the plurality of chunk files, a hash value for each of the chunk files is calculated in step S140. When the hash value for the chunk file is calculated, the hash value is transmitted to the server in step S150.

In the meantime, the server may have a hash table including information on a hash value for each of the plurality of chunk files which has been stored in the server. Therefore, when the hash value for each of the plurality of chunk files transmitted from the terminal device is compared with the hash table in step S160, it is known which chunk file is not stored in the server.

For example, when a file stored in the terminal device is divided into chunk files A, B, C, D, and E and only chunk files A, B, C, and D are stored in the server, since a hash value for the chunk file E is not included in the hash table which has been stored in the server, it is determined that the chunk file E needs to be transmitted to the server in order to synchronize the terminal device and the server.

When there is a hash value which is not included in the hash table as a result of comparing the hash value received from the terminal device with the hash table which has been stored in the server, the server requests the terminal device to transmit a chunk file corresponding to the hash value in step S170.

Next, the terminal device transmits the chunk file, which is requested to be transmitted, to the server, so that the synchronization between the terminal and the server is established in step S180.

As described above, in order to synchronize two devices, the entire file is not transmitted, but the file is divided into a plurality of chunk files and then hash values for the chunk values are transmitted to perform a synchronizing process, thereby minimizing a transmission amount required for synchronization and minimizing a time to perform synchronization.

That is, generally, a size of the chunk file is 64 MB, but a size of the hash value obtained by inputting the chunk file to a hash function is relatively very small, so that a time to transmit the hash value is shorter than a time to transmit the file.

As a result of comparison with the hash table which has been stored in the server, only a chunk file corresponding to a hash value which is not included in the hash table is received, so that an amount of data to be transmitted required for synchronization is significantly reduced.

Figure 2:
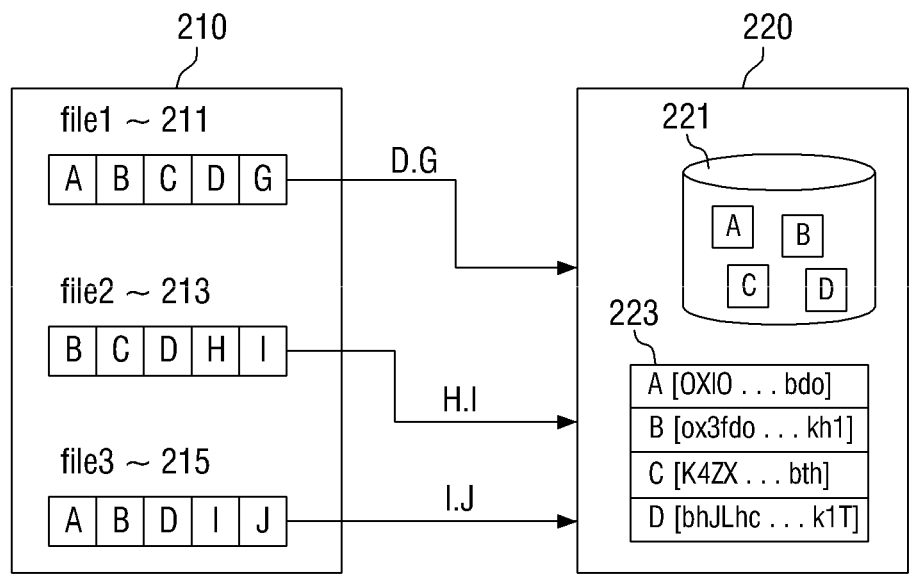
FIG. 2 is a view for explaining a method for performing a synchronizing process using a hash value for a chunk file according to an embodiment of the present invention.

FIG. 2 is a view for explaining a method for performing a synchronizing process using a hash value for a chunk file according to an embodiment of the present invention.

In the present embodiment, even though it is exemplified that the synchronization is established between the terminal device 210 and the server 220, the present invention is not limited thereto and the synchronization may be established between different electronic devices.

In the present embodiment, as an example, a first file 211 to a third file 215 are stored in the terminal device 210 and chunk files A, B, C, and D are stored in a storage 221 of the server 220.

That is, a fact that the chunk files A, B, C, and D have been stored in the storage 221 of the server 220 which is synchronized with the terminal device 210 in a previous step means that the chunk files A, B, C, and D are assembled to generate the first file 211 to the third file 215 which are stored in the terminal device 210.

However, referring to FIG. 2, it is known that since the first file 211 is configured by chunk files "A, B, C, D, and G", the second file 213 is configured by chunk files "B, C, D, H, and I", and the third file 215 is configured by chunk files "A, B, D, I, and J", new chunk files "G" is added to the first file 211, chunk files "H and I" are added to the second file 213, and chunk files "I and J" are added to the third file 215 by editing the files.

When the file is changed by adding new data, hash values for chunk files of first file 211 to third file 215 which are changed are transmitted to the server. That is, hash values for the chunk files A, B, C, D, and G of the first file 211, chunk files B, C, D, H, and I of the second file 213, and chunk files A, B, D, I and J of the third file 215 are transmitted to the server.

However, only the chunk files A, B, C, and D are stored in the storage 221 of the server 220 as illustrated in FIG. 2, so that only the hash values for the chunk files A, B, C, and D are included in the hash table 223.

That is, since hash values for the chunk files D and G of the first file 211, the chunk files H and I of the second file 213, and the chunk files I and J of the third file 215 which configure a file stored in the terminal device 210 are not included in the hash table 223, the terminal device 210 is requested to transmit the chunk files.

Next, the server 220 receives the chunk files D and G of the first file 211, the chunk files H and I of the second file 213, and the chunk files I and J of the third file 215 from the terminal device 210 to store the chunk files in the storage 221. Further, when a new chunk file is received and stored in the storage 221, a hash value for the newly received chunk file is included in the hash table 223.

As described above, when after dividing the file stored in the terminal device 210 into a plurality of chunk files and receiving hash values for the divided chunk files, a chunk file which has not been stored in the server 220 is requested to be transmitted to perform synchronization, an amount of data to be transmitted for synchronization is reduced and a time to transmit the data is minimized.

In the meantime, the file which is stored in the form of chunk files may be reassembled as a complete file using a file table and a metadata table included in the server.

Figure 3:
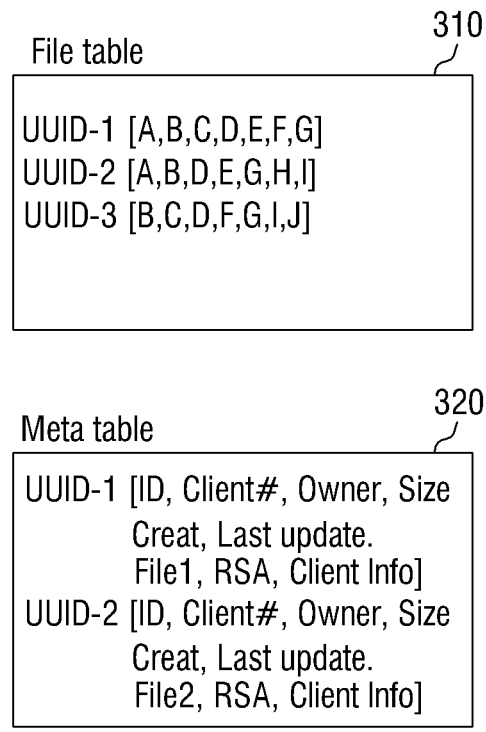
FIG. 3 is a view for explaining a file table and a metadata table.

FIG. 3 is a view for explaining a file table and a metadata table.

In the server 220, the entire file is not stored but the file is stored in the form of a plurality of chunk files which configures the file, so that another terminal device needs to also receive the file table 310 in order to assemble the chunk files as one file by receiving the chunk files from the server 220.

For example, when a user wants to synchronize a smart phone and the server 220 to store a file stored in the smart phone in the server 220 in the form of a chunk file and then additionally synchronize with a tablet PC which is another terminal device, the user needs to receive not only a chunk file stored in the server 220 but also a file table 310 used to generate a file using the chunk files.

Specifically, the file table 310 may include information for generating one file completed by the chunk files. For example, as illustrated in FIG. 3, the file table 310 may include information indicating that the first file is configured by chunk files A, B, C, D, E, F, and G and the second file is configured by chunk files A, B, D, E, G, H, and I.

Therefore, when another electronic device to be synchronized receives the plurality of chunk files stored in the server 220 and the above-described file table 310 together, a complete file may be generated.

Also, in the server, the metadata table 320 may also be stored in addition to the hash table 223 and the file table 310. The metadata table 320 includes metadata for a file which is generated by chunk files which are stored in the storage 221.

Specifically, the metadata table 320 may include various information on a file to be generated by the chunk files, for example, information on a file ID, an owner of the file, a file size, a generating time, and a latest updating time.

As described above, since the file table 310 of the file which is to be generated by chunk files and the metadata table 320 are stored in the server 220 in which the chunk files are stored, the chunk files, rather than the entire file, and the plurality of tables are downloaded, so that an amount of data to be transmitted required for the synchronization is reduced.

Figure 4:
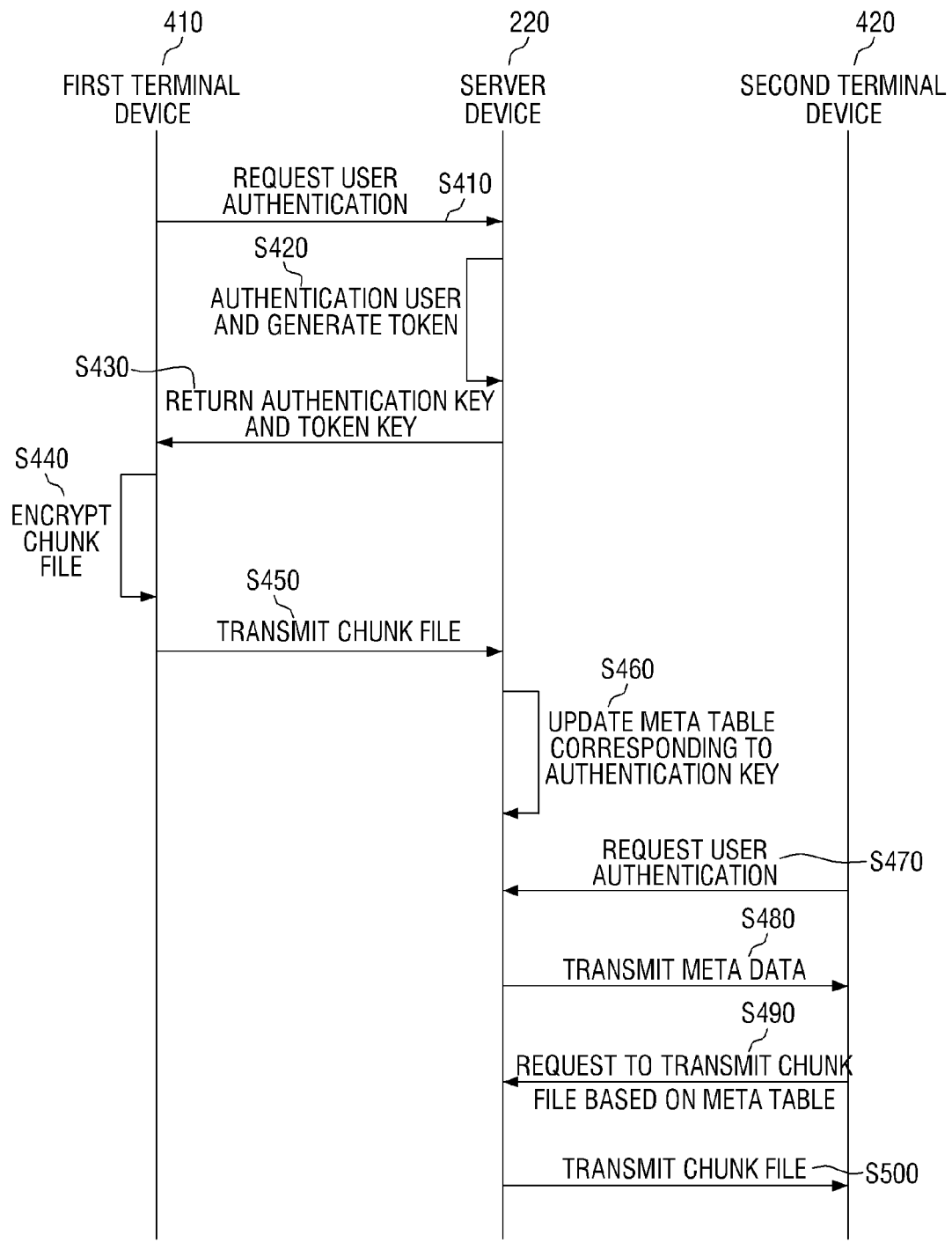
FIG. 4 is a flowchart for explaining a process where synchronization is performed in another terminal device according to an embodiment of the present invention.

FIG. 4 is a flowchart for explaining a process where synchronization is performed in another terminal device according to an embodiment of the present invention.

In the present embodiment, a process of synchronizing a new second terminal device 420 after the user synchronizes the first terminal device 410 and the server 220 will be described. When the user wants to synchronize a second terminal device 420 which is a new terminal device, if the user initially accesses a server 220 through the terminal device, a plurality of chunk files, a metadata table, a hash table, and a file table which are stored in the server 220 are transmitted to the second terminal device 420 which is the new terminal device.

Next, when a changed matter occurs in the plurality of chunk files, the metadata table, the hash table, and the file table stored in the server 220, the changed matter is transmitted to the second terminal device 420 to maintain the synchronization. Hereinafter, a process of first establishing the synchronization which reflects a changed matter between the first terminal device 410 and the server 220 when a changed matter occurs in a file stored in the first terminal device 410 and then establishing the synchronization between the server 220 and the second terminal device 420 will be described.

When a file stored in the first terminal device 410 has a changed matter in a state when the synchronization between the first terminal device 410 and the server 220 is established, the user requests from the server 220, user authentication using its own user account in order to reflect the changed matter to maintain the synchronization in step S410.

When the server 220 which receives the user authentication request checks authentication information and the authentication is successful, the server 220 generates an authentication key and a token key in step S420 and returns the keys to the user in step S430.

A process of dividing a file having a changed matter into a plurality of chunk files, calculating a hash value for each of the divided chunk files, and transmitting the hash value to the server 220 to transmit only a chunk file which has not been stored in the server is the same as in the above description and a redundant description will be omitted.

When a chunk file which will be transmitted to the server for synchronization is determined, a chunk file to be transmitted is encrypted using the token key obtained from the server 220 in step S440. Next, the encrypted chunk file is transmitted to the server 220 in step S450 and a newly received chunk file is stored in the storage.

When the new chunk file is stored in the server 220, changed matters are reflected to the hash table, the metadata table, and the file table corresponding to the user account to update the tables in step S460.

Next, when the user wants to additionally synchronize the second terminal device 420, the user authentication information is input through the second terminal device 420 to request, from the server 220, the user authentication user in step S470.

When the server 220 which receives the user authentication information precedes a user authentication process and the user authentication is successful, the server 220 transmits the updated metadata table, file table, and hash table to the second terminal device 420 in step S480.

The second terminal device 420 which receives the various updated tables compares the metadata table which has been stored with the updated metadata table to detect a file having a changed matter and transmits a chunk file transmission request for reflecting the changed matter to the file which has been stored to the server in step S490.

When the server transmits a newly added or changed chunk file to the second terminal device 420 in response to the transmission request, the second terminal device 420 receives the chunk file to newly store the added or changed chunk file or update the metadata table which has been stored in the second terminal device 420 to complete the synchronization.

As described above, instead of transmitting the entire file for synchronization, the metadata table information is first received from the server 220 and then only a chunk file having a changed matter is requested to be transmitted, so that an amount of data transmitted for synchronization is minimized and a time to perform synchronization is minimized.

Figure 5:
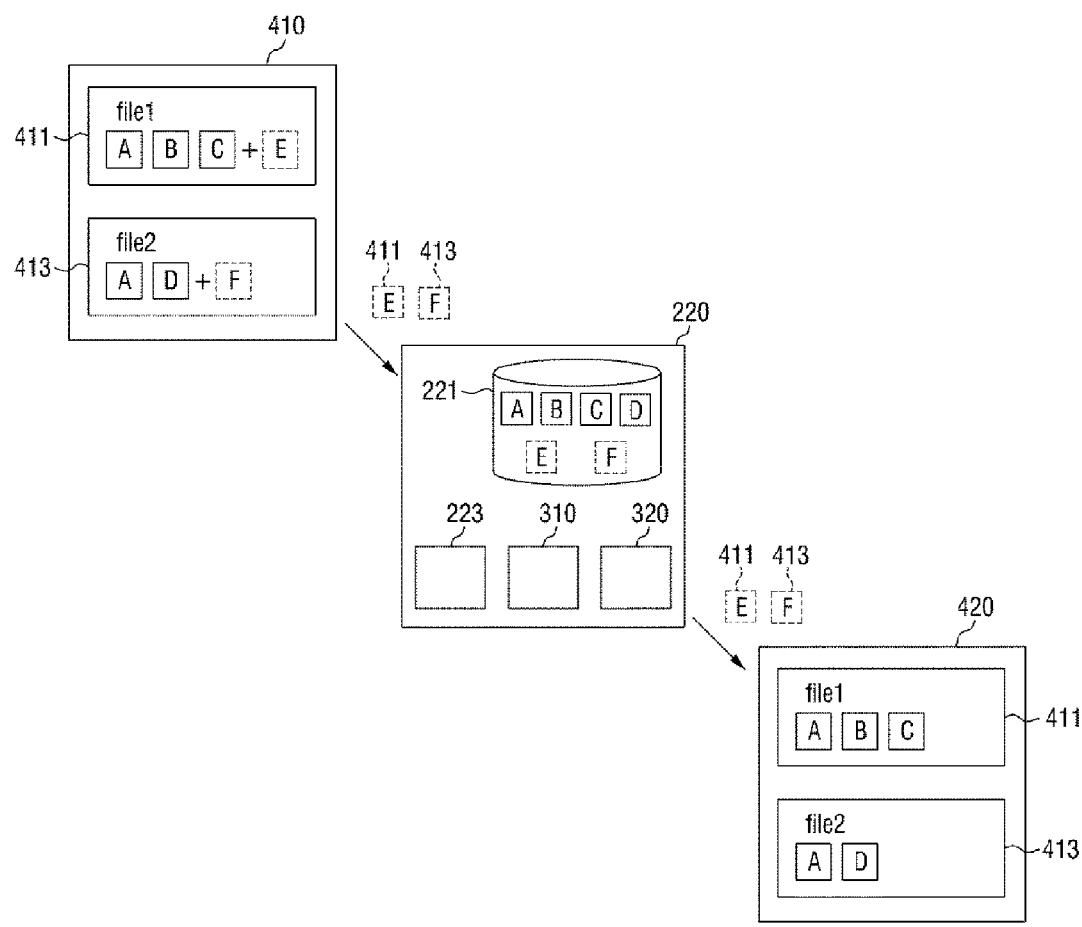
FIG. 5 is a view for explaining a process of synchronizing another terminal device using a metadata table.

FIG. 5 is a view for explaining a process of synchronizing another terminal device using a metadata table.

In the present embodiment, a process of performing synchronization again by adding or changing a file which has been stored in the first terminal device 410 by the user, in a state when the first terminal device 410, the server 220, and the second terminal device 420 are synchronized, will be exemplified.

That is, a process will be described in which in an initial state when a first file 411 configured by chunk files A, B, and C and a second file 413 configured by chunk files A and D are stored in the first terminal device 410, the server 220, and the second terminal device 420 to be synchronized, when the user modifies the first file 411 and the second file 413 through the first terminal device 410, the modified contents are also synchronized in the second terminal device 420 through the server 220.

When the user inputs a synchronization request signal between the first terminal device 410 and the server 220, it is determined whether there is a changed matter in the first file 411 and the second file 413 which have been stored in the first terminal device 410.

Specifically, since metadata of the first file 411 and the second file 413 includes information on updating, it may be determined whether there is a changed matter through the meta data.

When it is determined that there is a changed matter, a hash value for each chunk file including a chunk file E which is newly included in the first file 411 and a hash value for each chunk file included in the second file 413 are calculated to be transmitted to the server 220.

In the meantime, the changed matters of the first file 411 and the second file 413 are not reflected in the server 220, so that only existing chunk files which configure the first file 411 and the second file 413 are stored in the storage 221.

That is, the chunk files E and F are not stored in the storage 221, so that the hash values corresponding to the chunk files E and F are not reflected in the hash table 223.

Therefore, the server 220 requests the first terminal 410 to transmit the newly added chunk files E and f. When the new chunk file is received from the first terminal device 410, the new chunk file is stored in the storage 221 and the hash table 223, the file table 310, and the metadata table 320 are updated.

Next, the user accesses the server 220 through the second terminal device 420 to request synchronization to reflect the changed matter. In this case, the user accesses the server 220 through the second terminal device 420 using his/her user account to request the synchronization.

When the user accesses the server 220 through the second terminal device 420 with the user account, a metadata table 223 corresponding to the user account is transmitted to the second terminal device 420. As described above, the metadata table 223 includes a history on file updating, so that the metadata table is used to determine which file has a changed matter.

Next, hash values for a plurality of chunk files stored in the server 220 are received and compared with the hash value of the chunk file stored in the second terminal device 420 to request the server 220 to transmit the chunk files E and F which are not stored in the second terminal device 420, thus completing the synchronization.

In the meantime, in the above-described embodiment, even though the process of synchronizing a plurality of terminal devices which is used by the user using his/her user account with each other has been described, the synchronization may be established by allocating corresponding user accounts to a plurality of users.

Figure 6:
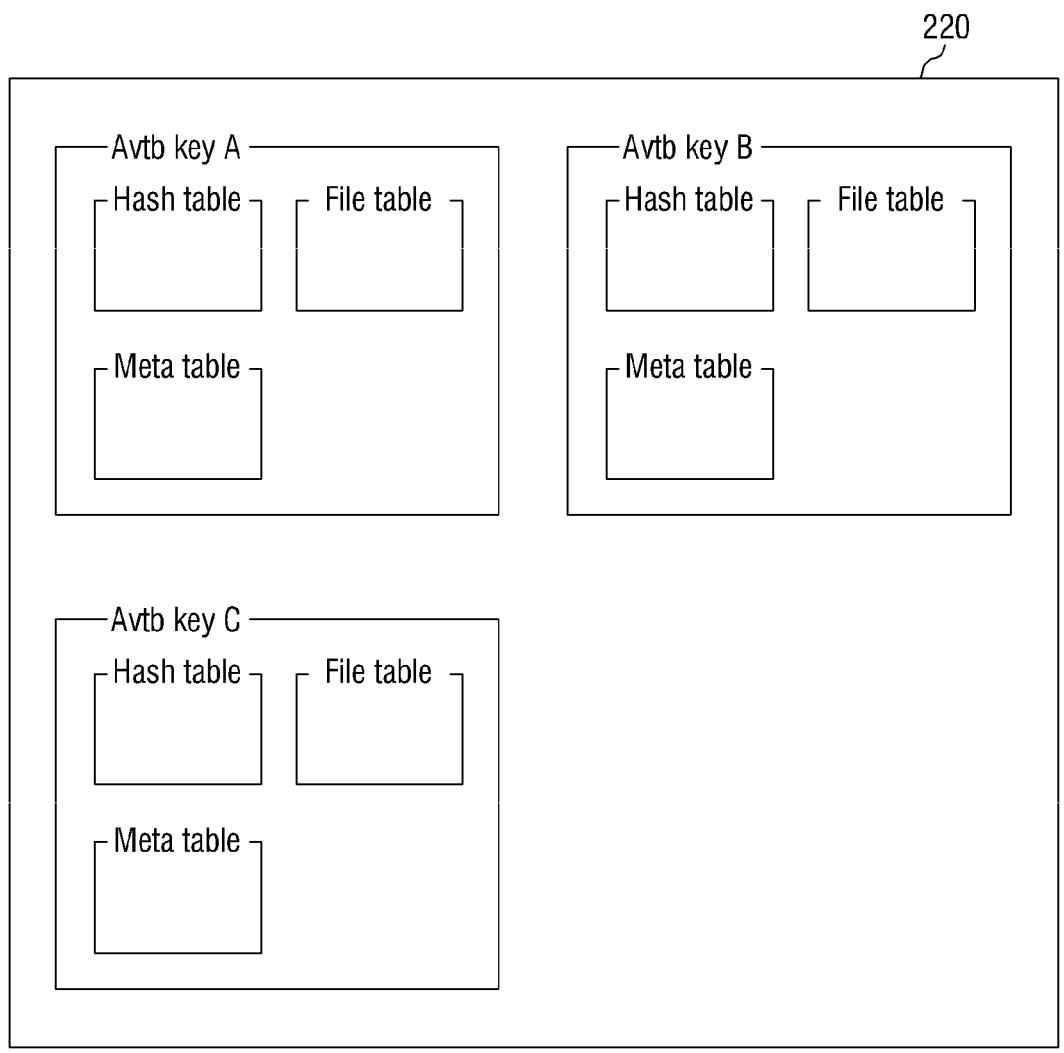
FIG. 6 is a view for explaining a method of generating and managing a metadata table, a file table, and a hash table for every user account according to an embodiment of the present invention.

FIG. 6 is a view for explaining a method of generating and managing a metadata table, a file table, and a hash table for every user account according to an embodiment of the present invention.

As illustrated in FIG. 6, a plurality of hash tables, file tables, and metadata tables corresponding to user authentication keys may be stored in the server 220.

When the user accesses the server 220 with his/her own account to update an added or changed chunk file to the server 220, the hash table, the file table, and the metadata table corresponding to the account are also updated.

When the user wants to additionally synchronize another terminal device, if the user accesses the server 220 with the user account by the terminal device to receive the metadata table, the file table, and the hash table corresponding to the user account, the user may receive a chunk file of the changed file. Therefore, the same effect as the effect that a file is duplicated as it is in the terminal device to be substantially synchronized is obtained.

For example, when user A wants to synchronize a smart phone and the server 220, the user accesses the server 220 with his/her user account and then transmits a chunk file of a file stored in the smart phone to the server 220.

In this case, the hash table, the file table, and the metadata table corresponding to user A are generated and stored in the server 220. Next, when the user wants to additionally synchronize a tablet PC which is another terminal device, the user accesses the server 220 with his/her own user account through the tablet PC and then receives a plurality of chunk files, the hash table, the file table, and the metadata table which are stored in the server 220 to establish synchronization.

As described above, when the metadata table, the file table, and the hash table corresponding to the user account are generated and the synchronization is established based the tables, an effect of substantially transmitting a file is obtained only by receiving the above-mentioned tables, thereby minimizing an amount of data transmitted and a time to perform the synchronization as compared with a case when a physical file is duplicated to perform the synchronization.

Figure 7:
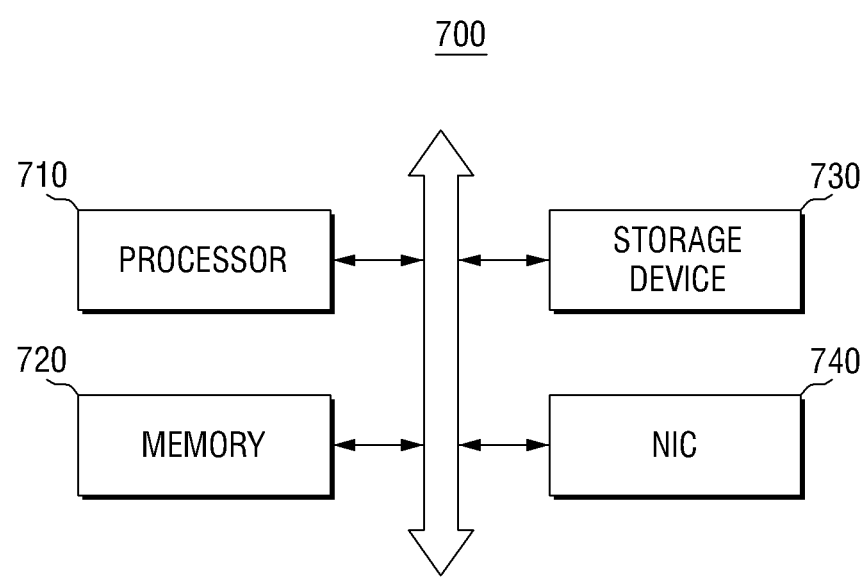
FIG. 7 is a view for explaining a terminal device 700 according to an embodiment of the present invention.

FIG. 7 is a view for explaining a terminal device 700 according to an embodiment of the present invention.

A terminal device 700 according to an embodiment of the present invention may include components illustrated in FIG. 7.

Specifically, the terminal device 700 may include a processor 710 which performs a command, a memory 720, a storage device 730 which stores a program which executes a packet transmission interval control method, and a network interface (NIC) 740 which transceives data with a device connected with the terminal device 700.

In the storage device 730, a program which executes a step of determining whether there is a changed matter in a file which is divided into a plurality of chunk files, a step of calculating a hash value for each of the plurality of divided chunk files when it is determined that there is a changed matter, a step of transmitting a hash value list configured by the calculated hash values to a server, a step of receiving a transmission request for a chunk file corresponding to a hash value which is not stored in the server, among the hash values included in the hash value list, and a step of transmitting the chunk file to the server in response to the transmission request may be stored and the above-described program may be loaded in the memory 620 and then executed by the processor 610.

Alternatively, in the storage device 730, a program which executes a step of receiving a metadata table including metadata information for a plurality files which has been stored in the server, a step of comparing the received metadata table with metadata of the file which has been stored in the terminal device to detect a file having a changed matter, a step of requesting the server to transmit a chunk file of the file having the changed matter, and a step of receiving the chunk file of the file having the changed matter from the server may be stored and the above-described program may be loaded in the memory 620 and then executed by the processor 610.

In the above-described embodiment, even though it is described that the terminal device has a configuration illustrated in FIG. 7, the server may also have the above-described configuration.

In this case, in the storage device 730, a program which executes a step of receiving hash values for a plurality of chunk files which has been stored in the terminal device, a step of comparing the stored hash table with the hash values for the plurality of chunk files received from the terminal device, a step of transmitting a transmission request signal for the chunk file corresponding to a hash value which is not included in the hash table to the terminal device, and a step of receiving a chunk file corresponding to the hash value which is not included in the hash table among the chunk files stored in the terminal device, in accordance with the transmission request signal may be stored.

Alternatively, in the storage device 730, a program including a step of calculating hash values for a plurality of chunk files which has been stored in the server, a step of transmitting a hash value list configured by the calculated hash values to the terminal device, a step of receiving a transmission request for a chunk file corresponding to a hash value which is not stored in the terminal device, among the hash values included in the hash value list, and a step of transmitting the chunk file to the terminal device in response to the transmission request may be stored.

The foregoing is illustrative of the present invention and is not to be construed as limiting thereof. Although a few embodiments of the present invention have been described, those skilled in the art will readily appreciate that many modifications are possible in the embodiments without materially departing from the novel teachings and advantages of the present invention. Accordingly, all such modifications are intended to be included within the scope of the present invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The present invention is defined by the following claims, with equivalents of the claims to be included therein.

What is claimed is:

1. A file synchronizing method of a terminal device, the method comprising:

determining a first synchronization target file having changed matter caused by a first chunk file and a second synchronization target file having changed matter caused by a second chunk file;

calculating hash values for each of the plurality of divided chunk files constructing at least one of the first synchronization target file and the second synchronization target file, the divided chunk files comprising the first chunk file and the second chunk file;

transmitting a hash value list that includes the calculated hash values to a server;

receiving a transmission request designating only for a chunk file corresponding to a hash value which is not stored in a hash table, the hash table storing hash values for each of every chunk file constructing at least one of already synchronized files, among the hash values included in the hash value list; and transmitting only the first chunk file of the first chunk file and the second chunk file to the server in response to the transmission request, when a hash value of the first chunk file and a hash value of the second chunk file are not stored in the hash table, wherein the hash value of the first chunk file is identical to the hash value of the second chunk file.

2. The method of claim 1, wherein the transmitting of only the first chunk file comprises encrypting the first chunk file with an authentication key received from the server in response to a user authentication request.

3. The method of claim 1, wherein the first chunk file is a new chunk file or a modified chunk file of the plurality of chunk files that is included in the first synchronization target and the second chunk file is a new chunk file or a modified chunk file of the plurality of chunk files that is included in the second synchronization target file.

4. A file synchronizing method of a server, the method comprising:

receiving hash values for each of a plurality of chunk files included in at least one of a first synchronization target file and a second synchronization target file which have been stored in a terminal device, the first synchronization target file having changed matter caused by a first chunk file and the second synchronization target file having changed matter caused by a second chunk file;

comparing the received hash values with hash values in a hash table storing hash values for each of every chunk file constructing each of already synchronized files;

selecting, as a result of the comparing, a hash value which is not stored in the hash table among the received hash values;

transmitting a transmission request signal designating only for a chunk file corresponding to the selected-hash value to the terminal device; and receiving only the first chunk file having the selected hash value, in response to the transmission request signal, wherein the first chunk file is included in the first synchronization target file and a second chunk file is included in the second synchronization target file and, a hash value of the second chunk file is identical to the selected hash value.

5. The method of claim 4, further comprising:

receiving a user authentication request from the terminal device; and generating a hash table, a file table, and a metadata table corresponding to user authentication information included in the user authentication request, wherein the file table includes information for generating a file using the chunk files and the metadata table includes metadata information of the file.

6. The method of claim 5, further comprising:

updating the hash table, the file table, and the meta table in response to receiving the first chunk file.

7. The method of claim 1, wherein whether the changed matter caused by the first chunk is determined based on metadata of the first synchronization target file and the changed matter caused by the second chunk is determined based on metadata of the second synchronization target file.

8. The method of claim 1, wherein the first chunk file is transmitted to the server in response to the transmission request in order to synchronize the first synchronization target file.

9. A file synchronizing method of a terminal device, the method comprising:

receiving a metadata table including metadata information for at least one of a first synchronization target file having changed matter caused by a first chunk file and a second synchronization target file having changed matter caused by a second chunk file, the first synchronization target file and the second synchronization target file having been stored in a server;

determining a first file as a file to be synchronized by comparing the received metadata table with a first metadata of the first file and a second file as a file to be synchronized by comparing the received metadata table with a second metadata of the second file, the first file and the second file having been stored in the terminal device;

receiving hash values of chunk files from the server, wherein the hash values are stored in a hash table storing hash values for each of every chunk file constructing at least one of the first synchronization target file and the second synchronization target file;

requesting the server to transmit a chunk file corresponding to a hash value which is only included in the received hash values by comparing the received hash values with hash values of chunk files constructing the first file and the second file in the terminal device;

receiving only the first chunk file of the first chunk file and the second chunk file from the server in response to the requesting, when a hash value of the first chunk file is identical to a hash value of the second chunk file; and generating the first synchronization target file by assembling the first file and the first chunk file, and the second synchronization target file by assembling the second file and the first chunk file in the terminal device.

10. The method of claim 9, further comprising:

updating the first metadata of the first file and the second metadata of the second file in response to receiving only the first chunk file.

11. The method of claim 9, wherein the receiving the metadata table further comprises:

transmitting user authentication information to the server; and receiving the metadata table which corresponds to the user authentication information in response to a successful user authentication process using the user authentication information.

12. The method of claim 9, wherein the receiving only the first chunk file further comprises receiving a file table from the server, and the generating comprises generating, based on the file table, the first synchronization target file and the second synchronization target file in the terminal device.

13. The method of claim 9, wherein the requesting the server comprises:

receiving hash values for a plurality of chunk files which have been stored in the server;

comparing hash values of a hash table stored in the terminal device with the received hash values; and transmitting a transmission request signal for a chunk file corresponding to a hash value which is not included in the hash table stored in the terminal device, to the server.

14. A file synchronizing method of a server, the method comprising:
   transmitting hash values stored in a hash table which have been stored in the server to a terminal, wherein the hash table storing hash values for each of every chunk file constructing at least one of a first synchronization target file and a second synchronization target file, wherein a first chunk file is included in the first synchronization target file and a second chunk file is included in the second synchronization target file;
   receiving a transmission request for only the first chunk file when a hash value of the first chunk file and a hash value of the second chunk file are not stored in the terminal device but included in the transmitted hash values; and
   transmitting the first chunk file to the terminal device in response to the transmission request,
   wherein the hash value of the first chunk file is identical to the hash value of the second chunk file.

15. The method of claim 14, wherein the transmitting the first chunk file comprises:
   generating an authentication key with user authentication information included in a user authentication request; and
   encrypting the first chunk file with the generated authentication key.

16. A computer program which is coupled with a computer device and stored in a non-transitory computer readable recording medium, the program being configured to execute:
   determining a first synchronization target file having changed matter caused by a first chunk file and a second synchronization target file having changed matter caused by a second chunk file;
   calculating hash values for each of the plurality of divided chunk files constructing at least one of the first synchronization target file and the second synchronization target file, the divided chunk files comprising the first chunk file and the second chunk file;
   transmitting a hash value list that includes the calculated hash values to a server;
   receiving a transmission request designating only for a chunk file corresponding to a hash value which is not stored in a hash table, the hash table storing hash values for each of every chunk file constructing at least one of already synchronized files, among the hash values included in the hash value list; and
   transmitting only the first chunk file of the first chunk file and the second chunk file to the server in response to the transmission request, when a hash value of the first chunk file and a hash value of the second chunk file are not stored in the hash table,
   wherein the hash value of the first chunk file is identical to the hash value of the second chunk file.

17. A computer program which is coupled with a computer device and stored in a non-transitory computer readable recording medium, the program being configured to execute:
   receiving hash values for each of a plurality of chunk files included in at least one of a first synchronization target file and a second synchronization target file which have been stored in a terminal device, the first synchronization target file having changed matter caused by a first chunk file and the second synchronization target file having changed matter caused by a second chunk file;
   comparing the received hash values with hash values in a hash table storing hash values for each of every chunk file constructing each of already synchronized files;
   selecting, as a result of the comparing, a hash value which is not stored in the hash table among the received hash values;
   transmitting a transmission request signal designating only for a chunk file corresponding to the selected hash value to the terminal device; and
   receiving only the first chunk file having the selected hash value, in response to the transmission request signal,
   wherein the first chunk file is included in the first synchronization target file and a second chunk file is included in the second synchronization target file and, a hash value of the second chunk file is identical to the selected hash value.

* * * * *